A. HARDY.
SPOOL WINDING DEVICE FOR CAMERAS.
APPLICATION FILED MAR. 3, 1915.
1,217,444.
Patented Feb. 27, 1917.
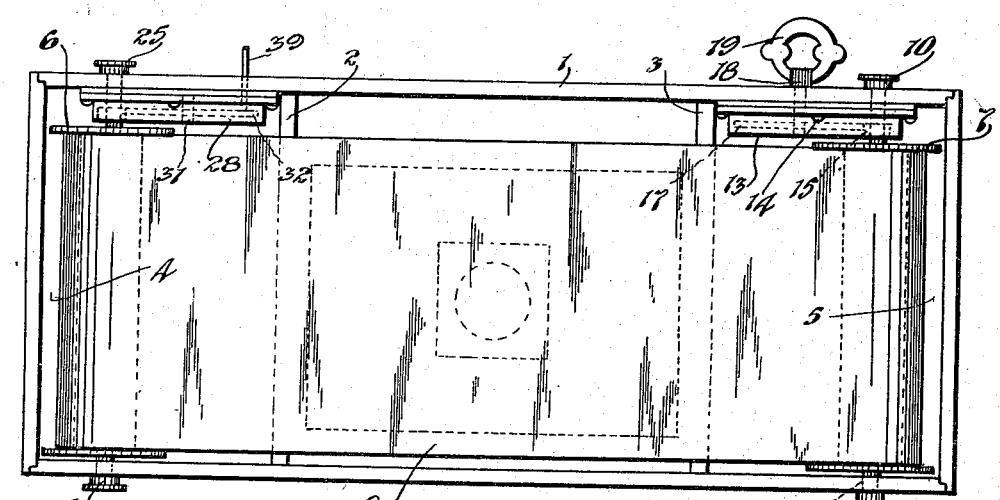
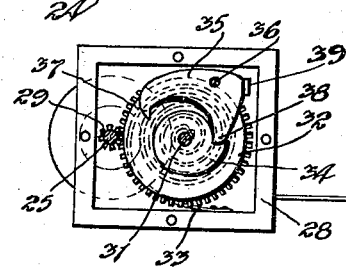
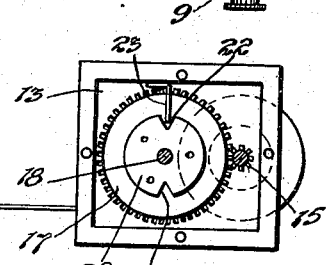
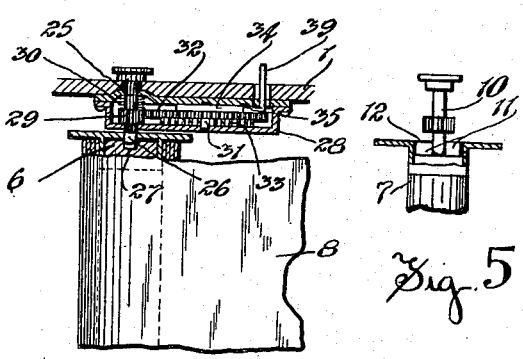
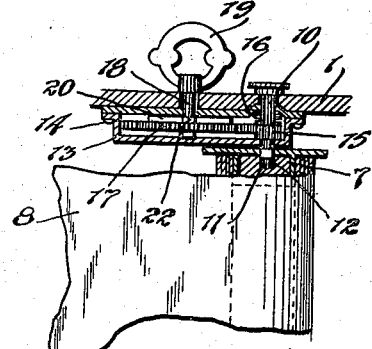
WITNESSES
INVENTOR
A. HARDY.
By
Attorney.

UNITED STATES PATENT OFFICE.

ARTHUR HARDY, OF WINNIPEG, MANITOBA, CANADA.

SPOOL-WINDING DEVICE FOR CAMERAS.

1,217,444.   Specification of Letters Patent.   Patented Feb. 27, 1917.

Application filed March 3, 1915.   Serial No. 11,824.

*To all whom it may concern:*

Be it known that I, ARTHUR HARDY, of the city of Winnipeg, in the Province of Manitoba, Canada, have invented certain new and useful Improvements in Spool-Winding Devices for Cameras, of which the following is the specification.

The invention relates to improvements in spool winding devices for cameras and the principal object of the invention is to provide a winding device for the film spools of a camera whereby the operator can, with a single set movement, draw or wind an exposed film onto the film receiving spool of the camera and withdraw, with the same movement, sufficient of the unexposed film from the other of the film spools for a full film exposure. A further object of the invention is to arrange the parts so that the movement required is a fixed and comparatively small one in proportion to the displacement of the film for exposure purposes. A still further object of the invention is to provide a means which will audibly indicate when the predetermined or set movement has been effected sufficient to expose the previously unexposed film. A still further object of the invention is to provide a means whereby a film which has been wholly or partially wound from the first to the second spool, can be, if desired, rewound onto the first spool by a step by step movement completely controlled by the operator.

With the above objects in view the invention consists essentially in the arrangement and construction of parts hereinafter more particularly described and later pointed out in the appended claims, reference being had to the accompanying drawing in which;

Figure 1 represents a back view of a camera with the usual closure back piece removed to expose the interior of the camera box.

Fig. 2 represents a plan view of the casings with contained parts which I secure to the box.

Fig. 3 is a vertical sectional view through the casing secured to one end of the box, certain of the contained and adjoining parts being shown in side elevation.

Fig. 4 is a vertical sectional view through the casing at the other end of the box, certain of the contained and adjoining parts being shown in side elevation.

Fig. 5 is a sectional view through the upper end of one of the spools and adjacent spindle.

In the drawing like characters of reference indicate corresponding parts in each figure.

1 represents the usual camera box fitted at the ends with cross partitions 2 and 3 set back somewhat from the ends of the box and forming spool boxes 4 and 5.

6 and 7 represent the usual film spools contained within the box and on which the film 8 is wound.

In connection with these spools, I wish to remark that the unexposed films are customarily wound on one of them and after insertion in the camera, one end of the film is drawn over the exposure area of the camera and attached to the other spool. This method of controlling the films is too well known to require further explanation. The present invention relates not to the mounting of the film on a spool or the winding of the film from one of the spools to the other, but rather to the particular manner in which the spools are actuated in the winding operation. In the present forms of cameras, the operator simply winds one spool until a number on the film appears through a sight opening provided in the camera box. A considerable number of turns have to be made in order to effect the complete displacement of any one film and further, sight has to be relied upon to effect the proper adjustment, so to speak, of the film. This practice is not only laborious, but it lacks speed and accuracy, which are obviously very desirable features in a camera mechanism. In my invention, both speed and accuracy are obtained in the winding and setting of the film, and they are accomplished in the manner now described.

The spool 7 has the lower end thereof mounted on a centering pin 9 and the upper end thereof carried by a centering spindle 10, which can be withdrawn slightly to release the T head 11 thereof from a rectangular slot 12 provided in the spool head. This slot is not of special construction, being provided, at present, in the majority of spools on the market. The arrangement is simply such that the spool can be taken out once the spindle is withdrawn and that the spool can be turned by the turning of the spindle.

The spindle is slidably mounted in an inclosing casing 13 provided, the casing being fastened to the camera box by nails, screws or such like 14.

A small pinion 15 is secured to the spindle and located within the casing and a spiral spring 16 is inserted on the spindle between the pinion and the casing, this spring being designed to press the spindle constantly inwardly.

17 is a gear wheel contained within the casing and meshing with the pinion, such gear wheel being carried by a short stub shaft 18 mounted in the sides of the casing and having an end protruding through the camera box and fitted with a finger piece 19.

It is to be noticed that the teeth of the pinion are considerably wider than the teeth of the gear wheel so that the pinion and gear wheel will remain in mesh in all positions of the spindle, that is, whether it is pulled out or left in.

20 is a signaling wheel mounted on the stub shaft and fastened in any suitable way, such as by riveting, to the gear wheel.

The signaling wheel is supplied on its periphery with a pair of diametrically opposing V-shaped notches 21 and 22.

23 is a flat spring having one end permanently secured to the casing and the opposite end extending inwardly toward the signaling wheel. This arrangement is such that the spring will effect a clicking sound for each half revolution of the spindle.

It is obvious that for the greater part of the turn, the spring rides on the face of the wheel and that when it reaches a notch it will spring into the notch and click against the face thereof and make an audible sound. The operator, when turning the spindle with his fingers applied on the finger piece 19, will know, simply by listening, that he has turned the spindle a half revolution. The reason for this will be apparent later.

The spool 6, at the other end of the box, is mounted at the one end on a centering pin 24 and at the opposite end on a spindle 25 provided with a T head 26 normally entering a rectangular slot 27 formed in the end of the spool. This spindle and its connection with the spool is the same as that previously described.

The spindle is mounted in a casing 28 suitably fastened to the camera box.

A pinion 29 is secured to the spindle within the casing and a spiral spring 30 encircles the spindle in a location between the pinion and the outer face of the casing. This arrangement allows the spool 6 to be removed by pulling the spindle 25 endwise outwardly.

I wish now to describe the way in which the film is wound from the spool 6 onto the spool 7 and also how the parts have to be designed to carry out my invention.

In any selected camera, the films for that camera have a certain set length on the film roll, and in applying my invention to the selected camera it is necessary that the gear wheel 17 and pinion 15 be designed such that, in the present instance, a half turn of the gear wheel effects a rotation of the spindle 10, a sufficient amount to wind the film roll on the spool 7 from the spool 6, one film displacement. I say in the above, "in the present instance, a half turn" for the reason that any proportion of turn could be used, this simply being a matter of design. A quarter or any other set turn of the stub shaft 18 could as readily effect, with the proper ratio of gear and pinion, the required film displacement for exposure purposes.

The above construction gives me the advantage, that the films of the camera can be brought into exposed position quickly and accurately, as a half turn of the finger piece effects the full movement of the film and it is unnecessary for the operator to be careful in effecting the half turn, for the reason that when the half turn is effected, a click is heard, this click being a signal for him to quit turning. The click is effected by the flat spring operating on the signal wheel as already explained.

In order that the film can be rewound, after winding, from the spool 7 onto the spool 6, I have supplied the parts now described which are contained within the casing 28 and are arranged to actuate the pinion 29 of the spindle 25.

31 is a short shaft mounted in the sides of the casing 28 and supplied with a comparatively large gear wheel 32 which is designed to mesh continuously with the pinion 29.

A flat coiled spring 33 is located within the casing 28 and has one end secured permanently to the shaft 31 and the other end fastened to the casing. This spring is arranged such that when the film is being unwound from the spool 6, the spring is being wound up by the action of the gear and pinion.

34 is a dog secured in any suitable way to the gear wheel 32 and 35 is a catch pivotally mounted on a pin 36 extending inwardly from the side of the casing.

The catch is formed with two opposing catch points 37 and 38 and also with an extending finger piece 39 which protrudes through the casing and camera box. The catch and dog are designed to release the wound spring upon the manipulation of the finger piece 39 and to effect a step by step winding movement of the film back onto the spool 6.

According to the arrangement shown, each time the catch is released, the gear wheel turns a half revolution, under the action of the spring, with the result that the pinion 29 operates to turn the spool sufficiently far to rewind one film or exposure on said spool.

By this arrangement the operator can reset a film in the exposure area of the camera. The spring also serves to keep a tension in the film as it is being wound. The value of these latter features is so obvious to a photographer, that it is not considered necessary to enlarge upon them further.

What I claim as my invention is:—

1. In a film camera the combination with a pair of rotatably mounted film spools, a film connected to the spools and designed to be wound from off one spool onto the other and means for winding the receiving spool, of a spring associated with the unwinding spool and arranged to be wound in the unwinding movement of the latter spool and a dog and an engaging catch associated with the latter spool and designed to prevent retrograde movement of said spool under the action of the spring and adapted when released to rewind a predetermined length of film.

2. In a film camera the combination with a pair of rotatably mounted film spools, a film connected to the spools and designed to be wound from off one spool onto the other and means for winding the receiving spool, of a spring associated with the unwinding spool and arranged to be wound in the unwinding of the film from the latter spool onto the receiving spool and a dog and a releasable engaging catch associated with the spring and arranged to allow of the winding of the spring and prevent, unless released, the unwinding thereof and designed, further, when released, to effect a step by step rotary movement of the latter spool under the action of the spring.

Signed at Winnipeg this 7th day of January 1915.

ARTHUR HARDY.

In the presence of—
G. S. ROXBURGH,
S. LEVETH.

Copies of this patent may be obtained for five cents each, by addressing the "Commissioner of Patents, Washington, D. C."